Figure 1:
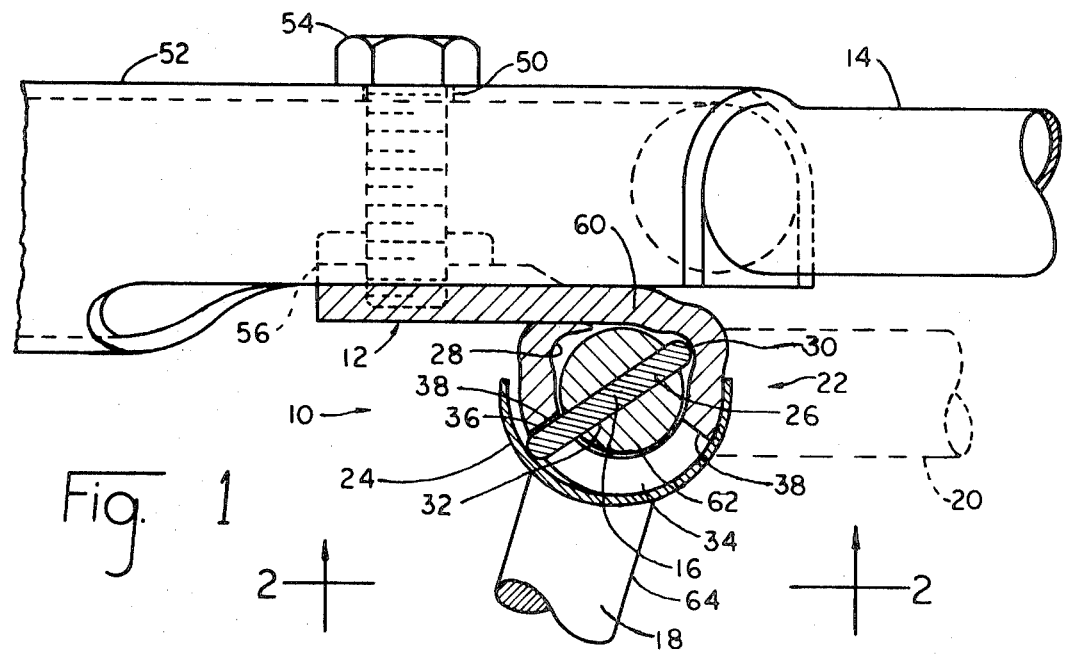

United States Patent

[11] 3,608,929

| [72] | Inventor | Martin R. Baginski<br>Austinberg Township, Ashtabula, Ohio |
|---|---|---|
| [21] | Appl. No. | 844,134 |
| [22] | Filed | July 23, 1969 |
| [45] | Patented | Sept. 28, 1971 |
| [73] | Assignee | Ashtabula Bow Socket Company<br>Ashtabula, Ohio |

[54] CYCLE KICKSTAND
16 Claims, 2 Drawing Figs.

[52] U.S. Cl. ........................................... 280/301
[51] Int. Cl. ............................................ B62h 1/02
[50] Field of Search .............................. 280/301, 293, 302, 303

[56] References Cited
UNITED STATES PATENTS

| 2,615,729 | 10/1952 | Atwood et al. | 280/301 |
| 2,496,593 | 2/1950 | Morgan | 280/301 |
| 2,685,452 | 8/1954 | Atwood et al. | 280/301 |
| 2,735,694 | 2/1956 | Atwood et al. | 280/301 |

*Primary Examiner*—Leo Friaglia
*Assistant Examiner*—John P. Silverstring
*Attorney*—Yount & Tarolli ABSTRACT: A cycle kickstand having a support leg which may be positioned in a cycle-supporting position or a storage position, includes a supporting member adapted to be secured to a cycle frame. The support leg is rotatably supported by the support member for movement between the cycle-supporting position and the storage position. A detent mechanism is provided which positively positions the support leg with respect to the support member in the cycle-supporting position and the storing position. The detent mechanism includes a floating key which is slidably supported in an opening in the support leg. A spring urges the floating key into communication with one of the members.

PATENTED SEP 28 1971

3,608,929

INVENTOR:
MARTIN R. BAGINSKI

BY:
Yount & Tarolli
ATTORNEYS

CYCLE KICKSTAND

The present invention relates to a cycle kickstand which includes a support member which is adapted to be secured to a cycle frame and a support leg which is rotatably supported by the support member for movement between a cycle-supporting position and a storage position and particularly relates to a cycle kickstand having a detent mechanism for positively positioning the support leg with respect to the support member.

Cycle kickstands which include a support member adapted to be secured to a cycle frame, and a support leg which is rotatably supported by the support member for movement between a cycle-supporting position and a storage position are known. One advantageous e design includes a split sleeve spring member which biases a pin member radially of the support leg. Such a design is representatively shown in Atwood, U.S. Pat. No. 2,685,452, which is assigned to the assignee of the present invention.

The aforementioned advantageous designs include separate means for positioning the support leg of the cycle kickstand in the cycle-supporting and storage positions, and for prohibiting overtravel of the support leg with respect to the support member. These design requirements are essential to the successful operation of any cycle kickstand.

In order for cycle kickstand to perform its intended function, it is essential that the support leg have a cycle-supporting position and, in order for it to remain mounted on the cycle during operation of the cycle, a storage position.

The second design requisite is to limit angular movement of the kickstand such that the support leg does not overtravel. For example, if the support leg is positioned in the cycle-supporting position, and means to prevent overtravel are not provided, when weight is exerted on the cycle and the cycle kickstand is required to support the cycle, the supporting leg will continue to travel and thus collapse allowing the cycle to fall over. It should be understood that the means to position the supporting leg will create a resistance to overtravel but will non prohibit overtravel. On the other hand, when the support leg is positioned in the storage position, it is essential that the support leg be positioned such that it will not block rotational movement of the cycle crank and thus prohibit further movement of the pedals.

Another design requirement is that means be provided to prohibit the support leg from being axially movable in the support member while allowing limited relative rotation therebetween. If the support leg is allowed to move in an axial direction, it may become locked with respect to the support member in which case the support leg cannot move freely from one position to the other. It is also possible, if such means to prohibit axial movement are not provided, for the support leg to be removed from the support member by either an axial force or vibrations.

Further requirements of such a kickstand are that the device operate with a substantially long life. When a substantially long life is obtained, the kickstand may be fixedly or permanently attached to the cycle frame and thus provide a permanent kickstand which does not become loosened during operation. In addition, the kickstand should be designed to eliminate contamination of the working parts of the kickstand.

The prior art has approached these problems with partial solutions requiring a multiplicity of parts and demand significant time to assemble and manufacture.

The immediate invention solves these problems by providing a kickstand which meets the design prerequisites with a minimum number of parts by incorporating many functions into each particular operable part. The kickstand of the present invention includes a support leg adapted to be secured to a cycle frame and a support leg which is rotatably supported by the support member for movement between a cycle-supporting position and a storage position. A detent mechanism is also provided for positively positioning the support leg with respect to the support member. The detent mechanism also serves to prohibit overtravel of the supporting leg and axial movement of the supporting leg with respect to the support member.

Accordingly, it is a principal object of the present invention to provide a cycle kickstand which includes a support member adapted to be secured to a cycle frame and a support leg which is rotatably supported by the support member for movement between a cycle-supporting position and a storage position and wherein the assembly of such a kickstand is simplified and requires a minimum of parts.

A further object of the present invention is the provision of a new and improved cycle kickstand having a support member adapted to be secured to a cycle frame and a support leg which is rotatably supported by the support member for movement between a cycle-supporting position and a storage position and a detent mechanism for positively positioning the support leg with respect to the support member, preventing overtravel of the support leg with respect to the support member and eliminating axial movement of the support leg with respect to the support member.

Figure 2:
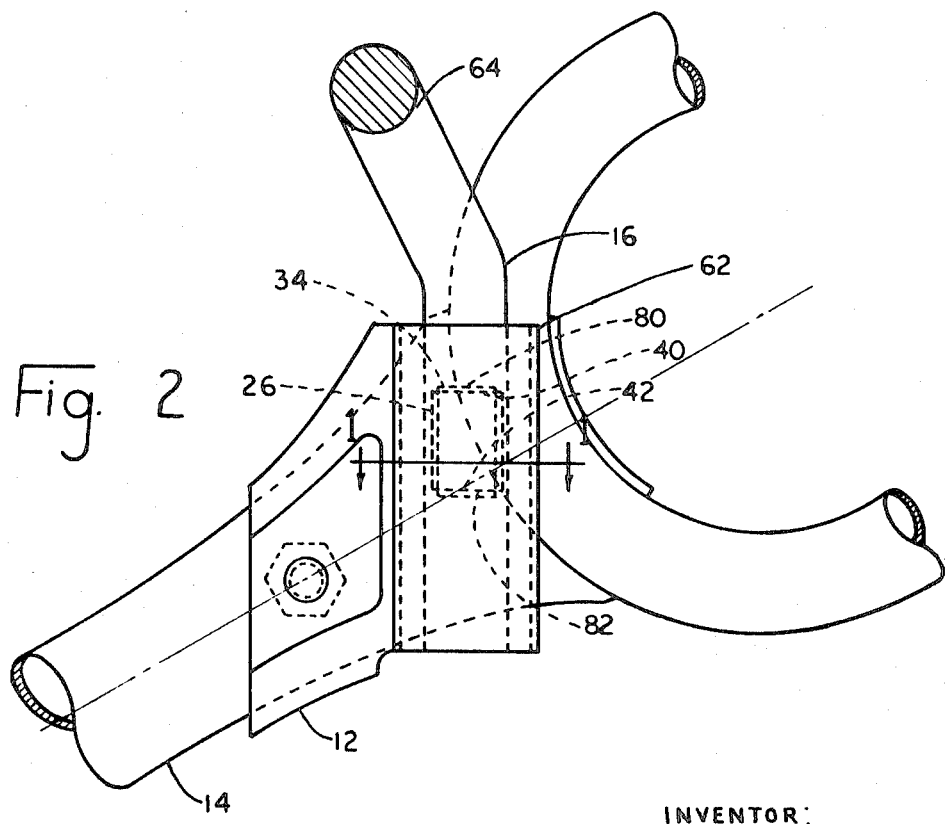

It is yet another object of the present invention to provide a cycle kickstand having a support member adapted to be secured to a cycle frame and a support member adapted to be secured to a cycle frame and a support leg which is rotatably supported by the support member for movement between a cycle-supporting position and a storage position and further includes a floating key positioned in an aperture in the support leg and a spring to urge the floating key in a radial direction relative to the support leg to bear against detents in the support member such that the support leg may be maintained in the cycle-supporting position or the storage position. Further objects and advantages of the novel features of the present invention will be apparent to those skilled in the art to which it relates from the following detailed description made with reference to the accompanying drawings forming a part of the specification and in which:

FIG. 1 is a side view of the kickstand of the present invention, a portion thereof being shown in section on line 1—1 of FIG. 2 to illustrate the construction and mode of operation of the kickstand of the present invention;

FIG. 2 is a bottom view of the cycle kickstand of the immediate invention taken along line 2—2 of FIG. 1. The present invention provides a new and improved kickstand for supporting a cycle. The kickstand of the immediate invention includes a support member adapted to be secured to a cycle frame and a support member adapted to be secured to a cycle frame and a support leg which is rotatably supported by the support member for movement between a cycle supporting position and a storage position. A detent mechanism is provided for positively positioning the supporting leg with respect to the support member. The immediate invention simplifies the manufacture of such a kickstand by incorporating a number of functions into a reduced number of parts. The present invention may be applied to kickstands of a wide variety of constructions and designs and for purposes of illustration, is described in connection with the kickstand 10 shown in FIGS. 1 and 2.

The kickstand 10 includes a support member 12 adapted to be secured to a cycle frame, generally indicated at 14, and a support leg 16 which is rotatably supported by the support member 12 for movement between a bicycle-supporting position 18 and a storage position, representatively shown in dotted lines at 20. A detent mechanism generally indicated at 22, is provided for positively positioning the support leg 16 with respect to the support member 12. The detent mechanism 22 includes a split sleeve spring member 24 which is positioned about the support member 12, a floating key 26 and detents 28, 30 in the support member 12. It should be understood that the detents 28, 30 may be formed in the spring 24 without affecting the operational characteristics of the kickstand 10 of the immediate invention. The floating key 26 is slidably received by an aperture 32 in the support leg 16. The floating key 26 extends through an opening 34 defined by positioning walls 36, 38 and axial walls 40, 42, in the support member 12. The spring 24 urges the floating key 26 into the detents 28, or 30, dependent on the position of the supporting rod 18. The positioning walls 36, 38 are located to engage the key 26 and serve to prevent overtravel of the support leg 16 past the cycle-supporting position 18 and storage position 20. The axial walls 40, 42 contact the floating key 26 when an axial force is exerted between the support leg 16 past the cycle-supporting position 18 and storage position 20. The axial walls 40, 42 contact the floating key 26 when an axial force is exerted between the support leg 16 and the support member 12 to restrict axial motion therebetween.

The cycle frame 14, as shown in FIGS. 1 and 2, has a hole 50 in a frame member 52 which receives a threaded fastener 54. The threaded fastener 54 threadedly engages a portion of the support member 12 such that the support member 12 is secured to the cycle frame 14. It should be understood that any mounting means may be used to secure the kickstand 10 of the immediate invention to the frame 14. The kickstand may also secured by welding to the frame 14. It should further be noted that the kickstand 10 is mounted to the frame 14 in an angular position such that the support leg 16 will be parallel to the cycle frame 14 when in a stored position and in an overcenter position with respect to the support member 12 when in a cycle-supporting position such that when additional weight is added to the cycle, the kickstand will not collapse or allow the cycle to fall over. It should further be noted that the threaded portion of the support member 12 may include a threaded member such as a nut 56.

The support member 12 generally has a tubular-shaped portion 60 having detents or recesses 28, 30 formed throughout a portion of the axial extent thereof. The detents 28, 30 receive the floating key 26. These detents have sufficient depth to position the support leg 16 upon application of a sufficient rotational force. It should be understood that these detents may extend throughout the axial extent the support member 12 without detrimentally affecting the operational characteristics such that the support leg 16 will be positioned in a storage position 20 or a cycle-supporting position 18, respectively, if the manufacturing processes require such a design. The opening 34 extends about a portion of the periphery of the portion 60 of the support member 12.

The positioning walls 36, 38 of the opening 34 in the support member 12 are located in a similar manner with respect to the detents or recesses 30, 28, respectively, such that the floating key 26 positions the supporting leg 16 in a storage position 20 or a cycle-supporting position 18. The axial walls 40, 42 of the opening 34 are also provided to prohibit axial movement of the support leg 16 while allowing relative rotation thereof.

The support leg 16 is formed from a solid rod in a shape which allows the support leg 16 to be in an overcenter relationship with respect to the support member 12 when in the cycle-supporting position 18 and also substantially parallel to the cycle frame 14 when in a storage position 20. It is to be understood that the support leg 16 may be formed from a tubular member in order to decrease the weight and manufacturing costs of the kickstand 10 of the immediate invention. Such a tubular support leg 16 may be reinforced by deformation of particular portions to provide a reinforced support leg 16. It is important to note that the angle at which the support member 12 is secured to the frame 14 and the angle that the extending end portion 62 of the support leg 16 makes with respect to the support portion 64 of the support leg 16 will jointly determine these relative positions. The extending end portion 62 of the support leg 16 is received by the tubular portion 60 of the support member 12.

The extending end portion 62 has an aperture 32 therein adapted to slidably receive the floating key 26. The aperture 32 is positioned with respect to the detents 28, 30 and opening 34 such that the support leg 16 is properly located. The floating key 26 is generally rectangular in cross section and has rounded ends. The rounded ends allow the key 26 to move into and out of the detent 28, 30 smoothly and minimize the shearing action when the floating key 26 moves into and out of engagement with the detents 28, 30. It should be understood that the cross section of the floating key 26 may be of any form and will not change the operational characteristics of the cycle kickstand 10 of the immediate invention.

The split sleeve spring 24 is positioned about the support member 12 about a portion of its periphery. The spring 24 also extends from one axial wall 40 to the other 42 such that the entire length of the floating key 26 will receive a force toward the support member 12. It should be understood that the floating key 26 is of sufficient length such that the spring 24 will always urge the key 26 toward the bearing member 12. When the floating key 26 is engaged by one of the detents 28, 30, the spring is in a slightly expanded state such that the key is urged toward the detent. When the support leg is rotated from one position to the other, the floating key 26 slides in the aperture 32 of the support leg 16. This motion of floating key 26 is created by the contact of one end of the floating key 26 with the tubular portion 60 of the support member 12. The spring 24 is expanded by such motion of the floating key 26 and creates a resistance to rotational movement of the support leg 16 and support member 12. When the support leg 16 is repositioned, the detend receives the floating key 26 in pressure engagement such that the support leg 16 is positioned thereby. It is apparent that the movement of the supporting leg from one position to the other requires force since the spring 24 constantly urges the floating key 26 toward the support member 12.

The floating key 26 is restricted in the amount of rotational movement by the positioning walls 36, 38 of the opening 34. When the support leg 16 is in a cycle supporting position 18, the floating key 26 will be adjacent to the positioning wall 36 to prevent overtravel of the support leg 16 and thus the cycle will not fall over. On the other hand, when the support leg 26 is in a storage position 20, the floating key will contact the positioning wall 38 and thus, the supporting portion 64 will not contact the cycle frame 14.

The floating key 26 has axial sides 38 and thus, the supporting portion 64 will not contact the cycle frame 14.

The floating key 26 has axial sides 80, 82 which communicate with the axial walls 40, 42 respectively, of the opening 34 to prohibit axial movement of the support leg 16 with respect to the support member 12.

The cycle kickstand 10 of the immediate invention includes a support member 12 which is adapted to be secured to a cycle frame 14 and a support leg 16 which is rotatably supported by the support member 12 for movement between a cycle-supporting position 18 and a storage position 20. A detent mechanism 22 is provided for positively positioning the support leg 16 with respect to the support member 12. The detent machine mechanism includes detents in the support member 12 in which a floating key 26 is slidably mounted in the support leg 16. The floating key 26 is urged by a spring 24 to maintain the support leg 16 in one of the positions 18, 20. Positioning walls 36, 38 are provided to prohibit rotational over travel of the support leg 16 and axial walls 40, 42 are provided to prohibit axial movement of the support leg 16. Thus, the immediate invention provides kickstand which reduces the number of ports required to perform the functions required of a kickstand and simultaneously increases the ease with which such a kickstand may be manufactured.

Having described my invention, I claim:

1. A cycle kickstand comprising a support member adapted to be secured to a cycle and having an opening therein, a cycle support leg having a portion rotatably received in said opening in said support member, said cycle support leg being rotatable relative to said support member between a cycle-supporting position and a storage position, and a detent mechanism for positioning said cycle support leg in said storage and cycle-supporting positions for blocking movement of said cycle support leg beyond said positions and for blocking relative axial movement of said support leg and said said detent mechanism comprising a key member slidably received by said portion of said support leg, for movement with respect thereto, said key member having end portions, each of said end portions extending outwardly of said support leg, and a spring member operable to bias said key member relative to said support leg portion to locate said key member in respective positions positively locating said support leg member in said storage and cycle-supporting positions, and preventing rotational movement beyond said positions said key member being operative to block relative axial movement of said support leg and said support member.

2. A cycle kickstand as defined in claim 1 wherein said key member of said detent mechanism is slidable radially in said portion of said support leg and received in an opening in said support member, said opening in said support member positioned such that said key member may be moved between said positions while blocking relative axial movement of said support leg and said support member and operable to block movement of said key member such that said cycle support leg is blocked from movement beyond said positions.

3. A cycle kickstand as defined in claim 1 wherein said support member includes a pair of recesses therein corresponding with said spring and cycle-supporting position of said support leg and wherein said floating key member has an end portion biased into said recesses by said spring member.

4. A cycle kickstand comprising a support member adapted to be secured to a cycle and having an opening therein, a cycle support leg having a portion rotatably received in said opening in said support member, said cycle support leg being rotatable relative to said support member between a cycle-supporting position and a storage position, and a detent mechanism for positioning said cycle support led in said storage and cycle-supporting positions and operable to block movement of said cycle-supporting leg beyond said positions, said detent mechanism comprising a key received in a radially extending passage in said support leg and rotatable relative to said support member with said support leg, and a spring member encircling at least a portion of said support member and engaging said key, one of said members having a pair of recesses therein which receive an end of said key when in its storage and cycle-supporting positions respectively, and said support member having spaced first and second surface for blocking movement of said key beyond its storage and cycle -supporting positions respectively thereby.

5. A cycle kickstand comprising a support member adapted to be secured to a cycle and having an opening therein, a cycle support leg having a portion rotatably received in said opening in said support member, said cycle support leg being rotatable relative to said support member between a cycle-supporting position and a storage position and a detent mechanism for positioning said cycle support leg in said storage and cycle-supporting positions and operable to block movement of said cycle support leg beyond said positions, said detent mechanism comprising a key member received in a radially extending passage in said portion of said support leg and slidable radially therein, and a spring member operable to bias said key member radially of said support leg portion to locate said key member in respective positions positively locating said support leg member in said storage and cycle-supporting positions, said support member having a pair of recesses therein corresponding with said storage and cycle-supporting positions of said support leg wherein said key member has one end portion biased into said recesses by said spring member and the other end movable in a slot in said support member and engageable with surface portions of said support member defining said slot to prevent movement of said support leg member beyond said storage and cycle-supporting positions respectively.

6. A cycle kickstand comprising a support member having an opening therein, a support leg having an end portion rotatably received in said opening in said support member and said end portion of said support leg having an aperture therein, a floating key slidably received in said aperture, said support member having an opening extending about a portion of the periphery thereof and in alignment with said floating key, a split sleeve spring member positioned about a portion of said support member and engageable with said floating key, such that said support leg may be positioned in a cycle-supporting position or storage position depending upon the position of said floating key, said support member having recesses therein adapted to receive the end of said floating key, said floating key being urged to one of said recesses by said split sleeve spring when in the cycle- supporting position while being restrained from further angular movement of said support leg past the cycle-supporting position by engagement of said floating key with a surface defining said opening in said support member, said floating key being urged in communication with another of said recesses by said split sleeve spring when in the storage position 13 being restrained from further angular movement of said support leg past the storage position by engagement of said floating key with a surface defining said opening in said support member.

7. A cycle kickstand as defined in claim 6 wherein said support leg is formed from a solid member.

8. A cycle kickstand as defined in claim 6 wherein said support leg is formed from a tubular member.

9. A cycle kickstand as defined in claim 6 wherein said support member includes said detents therein for receiving said floating key such that said supporting leg will be maintained in one of said supporting leg will be maintained in one of said positions.

10. A cycle kickstand as defined in claim 6 wherein said opening in said bearing member has axial walls, said floating key interposed between said axial walls such that axial movement of said support leg with respect to said support member is restricted.

11. A cycle kickstand as defined in claim 6 wherein said aperture in said support leg extends through said end portion.

12. A cycle kickstand as defined in claim 6 wherein said support member is adapted to be secured to a cycle frame.

13. A cycle kickstand comprising a tubular support member having detents therein, a split sleeve spring member positioned about a portion of said support member, a support leg having an end portion rotatably received in said support member and a floating key, said end portion of said support leg having an aperture extending therethrough adapted to slidably receive said floating key, said support member having an opening extending about a portion of the periphery thereof and having positioning walls which define the peripheral extent of said opening and axial walls which define the axial extend of said opening, said opening receiving said floating key such that said support leg may be positioned in a cycle support position or a storage position and moved therebetween, said floating key being urged in communication by said split sleeve spring with one of said detents when in the cycle-supporting position while being restrained from further angular movement of the support leg in a cycle-supporting position by said positioning walls of said support member, said floating key being urged in communication by said split sleeve spring with another of said detents when in the storage position while being restrained from further angular movement of said support leg past the storage position by said positioning walls of said support member.

14. A cycle kickstand as defined in claim 13 wherein axial movement of said support leg is prohibited by communication of said floating key with axial walls of said support member.

15. A cycle kickstand as defined in claim 13 wherein said support leg is formed from a solid member.

16. A cycle kickstand as defined in claim 13 wherein said support leg is formed from a tubular member.